F. PAULSON.
BOTTLE LOCKING DEVICE.
APPLICATION FILED MAR. 22, 1911.
1,017,997.
Patented Feb. 20, 1912.
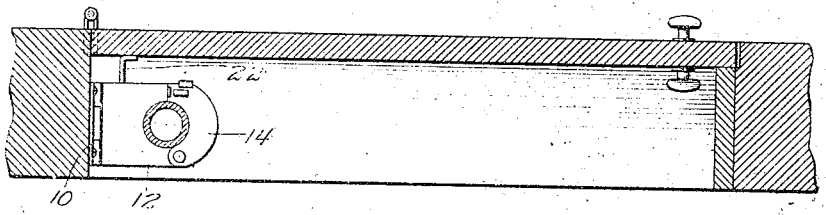
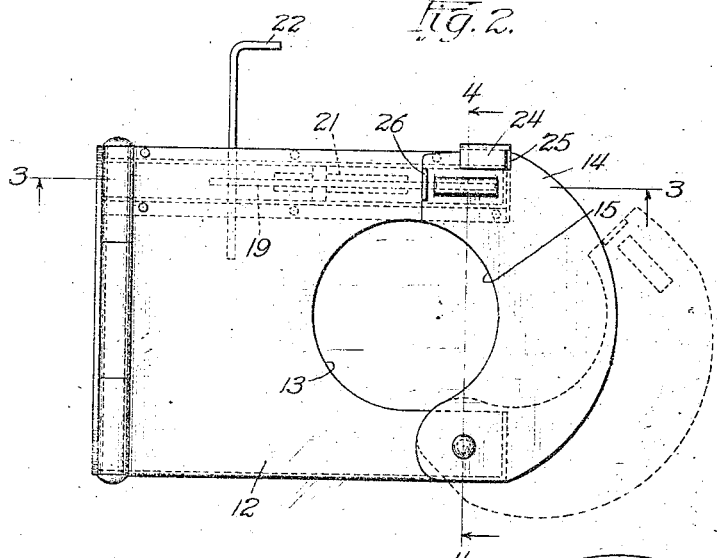
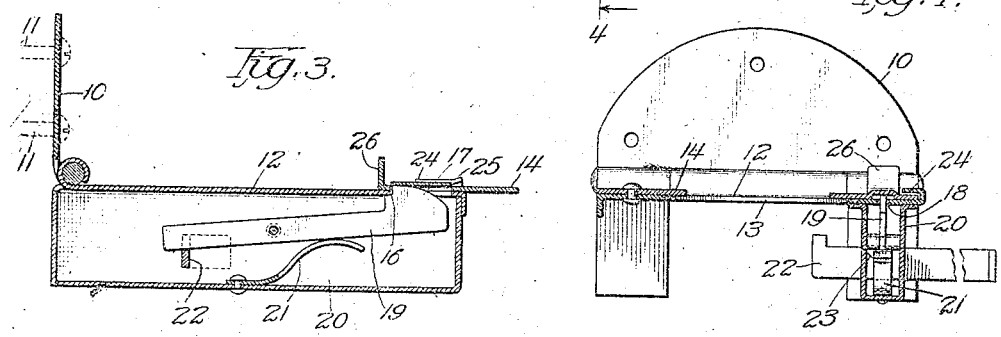
Witnesses:
Robert H. Weir
Charles G. Cope
Inventor
Fred Paulson
by Jno. Addington Ames Liebold
Attys

UNITED STATES PATENT OFFICE.

FRED PAULSON, OF GENEVA, ILLINOIS.

BOTTLE-LOCKING DEVICE.

1,017,997.

Specification of Letters Patent.   Patented Feb. 20, 1912.

Application filed March 22, 1911. Serial No. 616,264.

*To all whom it may concern:*

Be it known that I, FRED PAULSON, a subject of the King of Sweden, residing at Geneva, in the county of Kane and State of Illinois, have invented new and useful Improvements in Bottle-Locking Devices, of which the following is a full, clear, concise, and exact description, reference being had to the accompanying drawing, forming a part of this specification.

My invention relates to retaining devices for milk bottles and the like, and especially pertains to retaining devices of the kind which are provided with a lock constructed or arranged so as to coöperate with a door, window, or the like, in such a manner that the lock cannot be released until the door or window has been opened.

It is the object of my invention to improve upon devices of this character, and simplify the general construction thereof.

A bottle retaining device constructed in accordance with my invention is described in the following specification, and shown in the accompanying drawing, in which:

Figure 1 is a plan of the retaining device, showing the same applied to the casing of a door; Fig. 2 is a plan on a larger scale; Fig. 3 is a vertical section taken on the line 3—3 of Fig. 2; and Fig. 4 is a sectional end view, the section being taken on the line 4—4 of Fig. 2.

Referring to the drawing, 10 indicates a wall plate which is adapted to be secured, as by screws 11, to the door casing, outside the door, and adjacent the hinges thereof. Hinged to the wall plate 10 is a support plate 12 having formed in the front edge thereof a recess 13 of convenient size for receiving the neck of a milk bottle. Hinged to the support plate 12, at the front edge thereof, is a locking plate 14 which is formed at its inner edge with a recess 15 of corresponding shape to the recess 13 of the support plate 12. When a milk bottle has been hung in the recess 13 of the support plate 12, it may be locked in position by swinging the locking plate into the position shown in Fig. 2, in which position it is maintained by a catch. In the side of the locking plate 14 opposite to the hinge, is a shoulder 16 preferably formed by stamping up the metal of the locking plate. The shoulder 16 is engaged by a hook 17 which extends upward through an aperture 18 (Fig. 4) in the support plate, and which forms part of a lever 19 pivoted, intermediate its ends, in a casing 20 which extends downward from the support plate 12, at one side thereof. The lever 19 is normally held in its uppermost position by means of a leaf spring 21 secured to the bottom of the casing 20, but it may be moved down by the action of a transverse sliding latch 22 which is slidably mounted in a pair of vertical recesses in the casing 20 toward the rear end of the lever 19 and beneath the lever. In the upper edge of the latch 22 is cut a recess for receiving the lever 19, one side of which recess is inclined as at 23 (Fig. 4). By pulling upon the latch 22 the hook 17 of the lever 19 may be caused to move downward out of engagement with the shoulder 16 of the locking plate 14, owing to the action of the surface 23 in forcing the rear end of the lever 19 upward. The strength of the spring 21 is sufficient to return the latch 22 to its normal position, by the action of the rear end of the lever 19 upon the surface 23 of the latch. The support plate 12 carries a bent over lug 24 adjacent the aperture 18, which lug serves to prevent the locking plate 14 from being lifted upward out of engagement with the hook 17. The front end of the lug 24 is flared upward, as at 25, to facilitate inserting the end of the locking plate beneath the lug. The locking plate is provided with an upwardly extending projection 26 which serves as a handle.

Fig. 1 shows the retaining device with a bottle locked therein and with the door of the house shut against the latch 22. Under these conditions it is not possible to move the locking plate 14 to the right, owing to the fact that the hook 17 engages the shoulder 16 thereof, and the latch 22 cannot be moved to release the hook. The locking plate cannot be swung to the left owing to the presence of the neck of the bottle. When, however, the house door is opened, the latch 22 can be pulled outward, with the effect that the hook 17 is depressed, and the locking plate 14 thereby released. The locking plate can then be swung to the right and the milk bottle removed from the support plate 12. The whole device is then folded up against the wall plate 10 so as to be out of the way until it is swung down when another milk bottle is to be placed therein. The locking plate 14 may always be opened when no bottle is present in the retaining device. This is due to the fact that the locking plate can always be swung to the left (Fig. 2), the hook 17 being forced down by the engagement of the locking plate with its beveled front end. This is a considerable advantage since it insures that the device can always be in condition to receive a bottle, it being impossible, except by the insertion of a bottle, to lock the retaining device so that it cannot be opened by swinging the locking plate 14 to the left. As has been said, however, as soon as a bottle has been placed in the retaining device, the device cannot be opened until the house door is opened.

Having thus described my invention what I claim as new and desire to secure by Letters Patent is:

1. A milk bottle retaining device comprising a support member, a locking member, said members being adapted to receive a milk bottle between them, and said locking member being pivoted to said support member so as to be capable of being swung through a complete circle about its pivot in one direction, and a releasable latch for preventing swinging of said locking plate in the opposite direction, whereby, when a bottle is in the device, the bottle prevents swinging of the locking plate in one direction and said latch prevents swinging in the other direction.

2. A milk bottle retaining device comprising a support member adapted to be attached to the casing of a door or window, a locking member, said members being adapted to receive a milk bottle between them, and said locking member being pivoted to said support member so as to be capable of being swung through a complete circle about its pivot in one direction, and a releasable latch carried by said support member and disposed in such position thereon as to engage the door or window when the device is attached to the casing, whereby, when a bottle is in the device, the bottle prevents swinging of the locking plate in one direction and said latch prevents swinging in the other direction except when the door or window has been opened.

3. A milk bottle retaining device for attachment to the casing of a door or window comprising a horizontally disposed support plate having a notch in one edge thereof, a locking plate pivoted to said support plate in such manner as to be capable of being swung through a complete circle about its pivot in one direction, said locking plate being formed with a shoulder and also having a notch formed in one edge thereof, the notches in said support plate and said locking plate being so arranged as to form, together, an aperture suited to receive the neck of a milk bottle, a spring pressed latch adapted to engage behind the shoulder of said locking plate, thereby to prevent said locking plate from being swung in the other direction, said latch having an inclined face, whereby, when a bottle is in the device, the bottle prevents swinging of the locking plate in one direction and said latch prevents swinging in the other direction.

In witness whereof, I have hereunto subscribed my name in the presence of two witnesses.

FRED PAULSON.

Witnesses:
O. B. NELSON,
J. C. LONG.